United States Patent
Luo

(10) Patent No.: US 8,089,588 B2
(45) Date of Patent: Jan. 3, 2012

(54) THIN-FILM TRANSISTOR ARRAY SUBSTRATE

(75) Inventor: Fang-Chen Luo, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 1303 days.

(21) Appl. No.: 11/163,725

(22) Filed: Oct. 28, 2005

(65) Prior Publication Data
US 2006/0038942 A1    Feb. 23, 2006

Related U.S. Application Data

(62) Division of application No. 10/249,991, filed on May 26, 2003, now Pat. No. 7,084,942.

(30) Foreign Application Priority Data

Jul. 3, 2002    (TW) ................................ 91114696 A

(51) Int. Cl.
*G02F 1/1368* (2006.01)
*G02F 1/1343* (2006.01)

(52) U.S. Cl. .......................... 349/114; 349/48; 349/144

(58) Field of Classification Search ............... 349/43, 349/48, 113, 114, 143, 144, 149, 42, 54; 345/92, 93; 257/59, 72
See application file for complete search history.

(56) References Cited

U.S. PATENT DOCUMENTS

| 4,775,861 A * | 10/1988 | Saito ............................... 345/93 |
| 6,195,140 B1 * | 2/2001 | Kubo et al. ..................... 349/44 |
| 6,806,929 B2 * | 10/2004 | Chen et al. .................... 349/114 |
| 2003/0214472 A1 * | 11/2003 | Chen ............................... 345/87 |

* cited by examiner

*Primary Examiner* — David Nelms
*Assistant Examiner* — Tai Duong
(74) *Attorney, Agent, or Firm* — Jianq Chyun IP Office

(57) ABSTRACT

A thin-film transistor array substrate, used in a transflective liquid crystal display. The thin-film transistor array substrate has a substrate, a plurality of pixels, a plurality of scan lines and a plurality of data lines. Each of the pixels has a transparent sub-pixel and a reflective sub-pixel, while the transparent sub-pixel further has a transparent electrode and a first thin-film transistor, and the reflective sub-pixel has a reflective pixel electrode and a second thin-film transistor. The pixel electrode of each sub-pixel is thus electrically connected to a different thin-film transistor. The step of forming a molybdenum layer is thus not required, saving fabrication cost.

5 Claims, 5 Drawing Sheets

THIN-FILM TRANSISTOR ARRAY SUBSTRATE

CROSS-REFERENCE TO RELATED APPLICATION

This application is a divisional of a prior application Ser. No. 10/249,991, filed May 26, 2003, which claims the priority benefit of Taiwan application serial no. 91114696, filed Jul. 03, 2002. All disclosures are incorporated herewith by reference.

BACKGROUND OF THE INVENTION

1. Field of the Invention

The invention relates in general to a thin-film transistor array substrate typically used in a transflective liquid crystal display, and more particularly, to a thin-film transistor array substrate of which the pixel electrodes of the transparent sub-pixels and reflective sub-pixels are electrically connected to different transistors.

2. Related Art of the Invention

The advancement of multimedia basically results from the progress of semiconductor device or display apparatus design. Conventional display apparatus such as the cathode ray tube (CRT) have dominated the market for decades due to its excellent display quality and economics. However, issues of space utilization and power consumption exist in cathode ray tubes. Therefore, the light, thin, short and small thin-film transistor liquid crystal display (TFT LCD) with high display quality and low power consumption has gradually replaced the cathode ray tube to become main stream in the market. If the fabrication cost of the thin-film transistor liquid crystal display can be reduced, the market share and competition will be greatly increased. Characterized by the display method, the liquid crystal display can be divided into the transmissive type liquid crystal display, the reflective type liquid crystal display, and the transreflective type liquid crystal display.

In U.S. Pat. No. 6,195,140, a transreflective type liquid crystal display is described. FIGS. 1 and 2 show the top view and cross sectional view of the conventional transreflective type liquid crystal display. In FIG. 1, a thin-film transistor substrate 100 including a thin-film transistor 102 and a pixel 104 is shown. The pixel 104 has a reflective region R and a transparent region T. The reflective region R of the pixel 104 consists of a reflective pixel electrode 106 made of aluminum material, and the transparent region T of the pixel 104 consists of a transparent pixel electrode 108 made of material such as indium tin oxide. Each thin-film transistor 102 is used to control a pixel 104 including one reflective pixel electrode 106 and a transparent pixel electrode 108.

FIG. 2 shows the cross sectional view cutting along the line I-II of FIG. 1. The thin-film transistor 102 has a source/drain region 12 electrically connected to the transparent pixel electrode 108. A molybdenum layer 110 is further formed between the transparent pixel electrode 108 and the reflective pixel electrode 106. While fabricating the pixel 104, formation of the molybdenum layer 110 prevents corrosion problems caused by electrochemical reaction.

However, in the conventional thin-film transistor array substrate, the molybdenum layer, though improving the corrosion problem caused by electrochemical reaction, increases the fabrication cost.

SUMMARY OF THE INVENTION

The present invention provides a thin-film transistor array substrate used in transreflective liquid crystal display. Each of the sub-pixels has a pixel electrode connected to different thin-film transistor to save the step for forming a molybdenum layer. Therefore, the fabrication cost is reduced.

The thin-film transistor array substrate provided by the present invention comprises a substrate, a plurality of pixels, a plurality of scan lines and a plurality of data lines. Each of the pixels further comprises a transparent sub-pixel and a reflective sub-pixel. The transparent sub-pixel includes a transparent pixel electrode and a first thin-film transistor, and the reflective sub-pixel includes a reflective pixel electrode and a second thin-film transistor.

The first and second thin-film transistors are formed at the same or different sides of the transparent and reflective sub-pixels. When the first and second thin-film transistors are formed at the same side, the scan lines are divided into the first scan lines and the second scan lines. The first scan lines are electrically connected to the first thin-film transistors, and the second scan lines are electrically connected to the second thin-film transistors. When the first and second scan lines are formed at different sides, the first and second thin-film transistors are formed at the same scan line or data line and electrically connected thereto.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
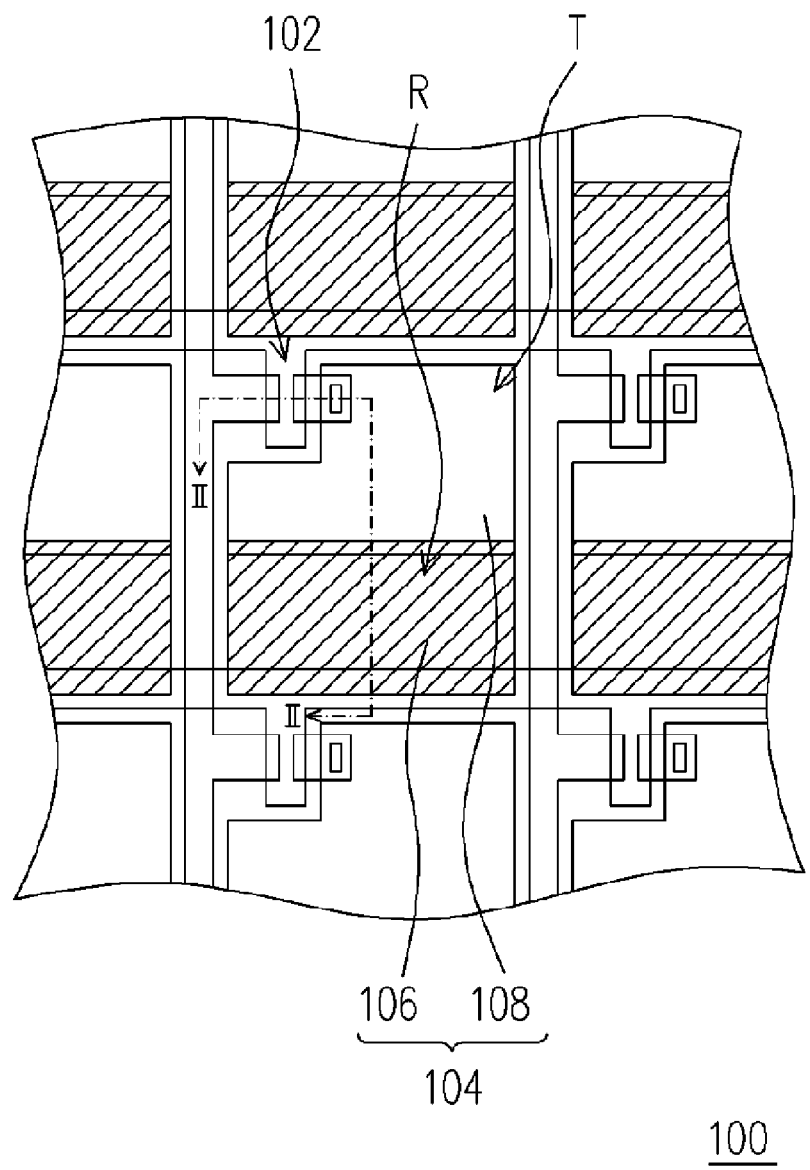
FIG. 1 shows the top view of a thin-film transistor array substrate of a conventional transreflective liquid crystal display.
Figure 2:
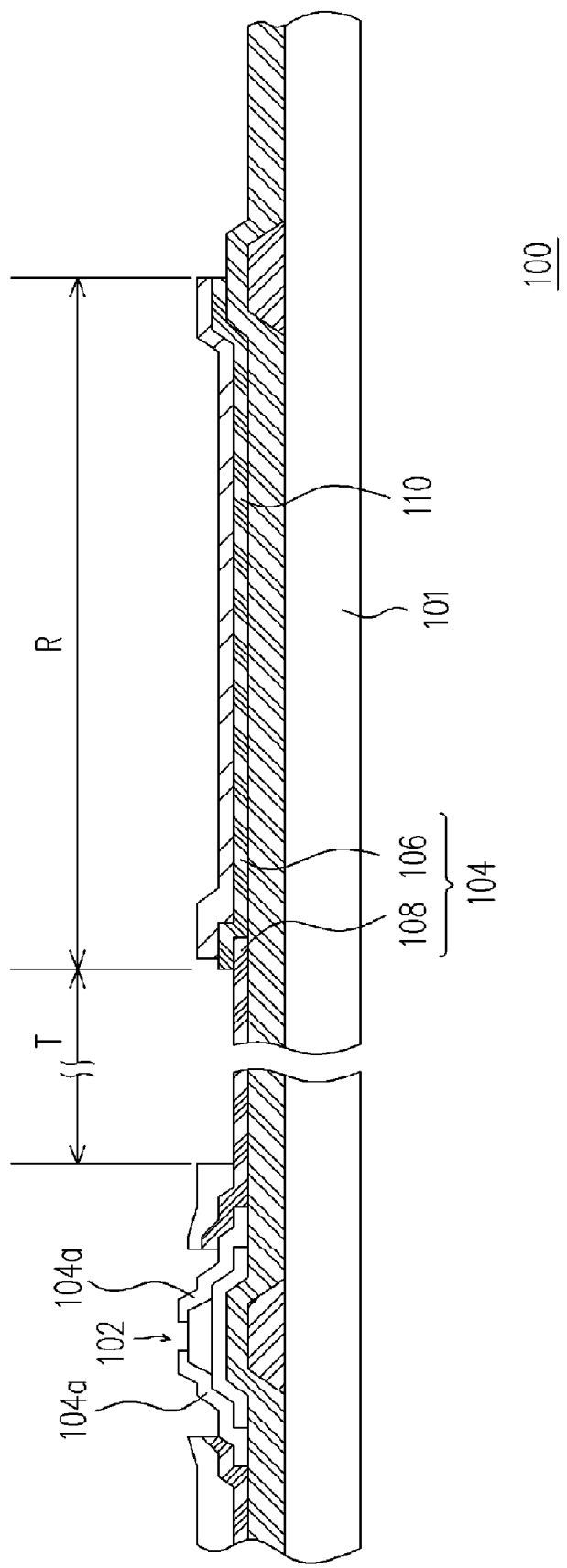
FIG. 2 shows the cross sectional view of the thin-film transistor array substrate as shown in FIG. 1.
Figure 3:
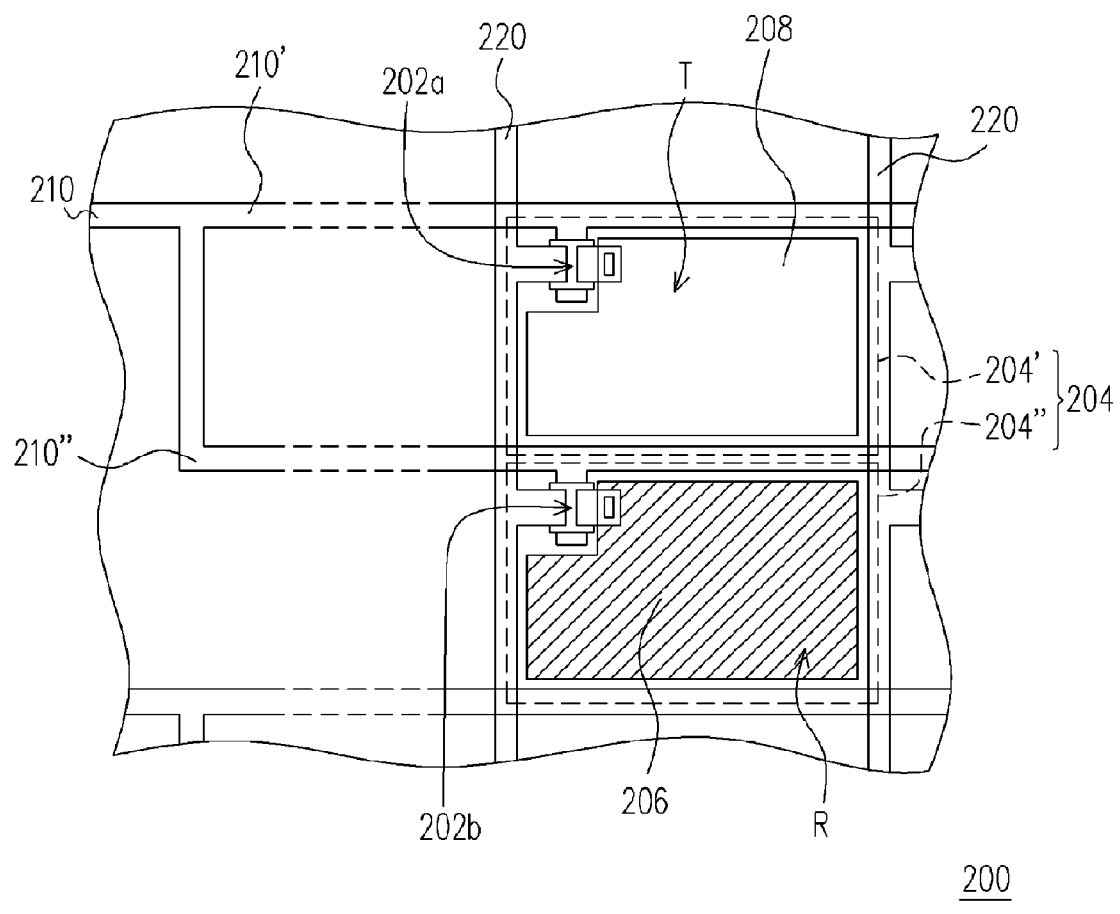
FIG. 3 shows the top view of a thin-film transistor array substrate in a first embodiment of the present invention.

Referring to FIG. 3, in a first embodiment of the present invention, a thin-film transistor array substrate 200 of a transreflective liquid crystal display comprises a substrate (not shown), a plurality of pixels 204, a plurality of scan lines 210 and a plurality of data lines 220. Each of the pixels 204 is located between two neighboring scan lines 210 and two neighboring data lines 220. Each pixel 204 has a plurality of sub-pixels.

In this embodiment, each pixel 204 has a transparent sub-pixel 204' and a reflective sub-pixel 204". Each transparent sub-pixel 204' defines a transparent region T, while each reflective sub-pixel 204" defines a reflective region R. Each transparent sub-pixel 204' includes a transparent pixel electrode 208 and a first thin-film transistor 202a, while each reflective sub-pixel 204" has a reflective pixel electrode 206 and a second thin-film transistor 202b. The reflective pixel electrode 206 is made of a material with high reflectivity such as aluminum, silver, tantalum, tungsten, and alloys of the above. The surface of the reflective pixel electrode 206 has a plurality of protrusions and recessions to obtain high reflection. The transparent pixel electrode 208 is made of a material with high transmission such as indium tin oxide (ITO). The neighboring transparent and reflective sub-pixels 204' and 204" of the pixels 204 can be formed at the same column or row, or alternately disposed. The present invention does not limit the position of the transparent and reflective sub-pixels 204' and 204".

The first and second thin-film transistors 202a and 202b are formed at the same side of the transparent and reflective sub-pixels 204' and 204", respectively. For example, the first and second thin-film transistors 202a and 202b are formed at the upper left corner of the respective sub-pixels 204' and 204", respectively. The scan line 210 has at least one first scan line 210' and at least one second scan line 210". The first and second scan lines 210' and 210" are parallel to each other and extend to the edge of the substrate, so as to electrically connect together. In addition, the first thin-film transistor 202a is electrically connected to and driven by the first scan line 210', while the second thin-film transistor 202b is electrically connected to and driven by the second scan line 210". That is, the sub-pixel of each pixel 204 such as the transparent sub-pixel 204' and the reflective sub-pixel 204" are disposed at two neighboring data lines 220 between the first scan line 210' and the second scan line 210". The first scan line 210' and the second scan line 210" can belong to the same scan line or the neighboring scan lines.

Thereby, each transparent or reflective sub-pixel are separately disposed and driven by different thin-film transistors without forming the additional molybdenum layer. The corrosion problem caused by electrochemical reaction is thus resolved.

Figure 4:
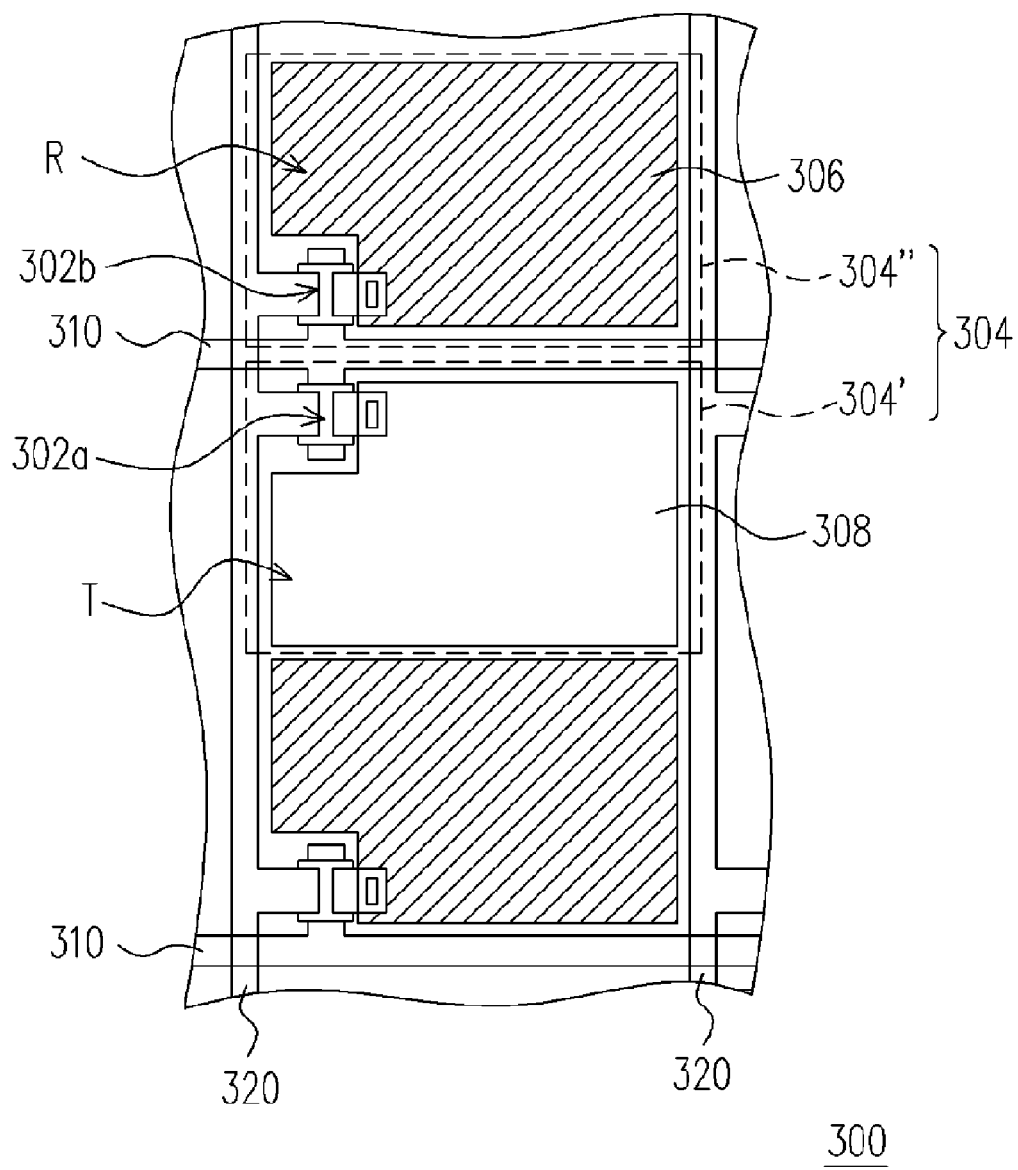
FIG. 4 shows the top view of a thin-film transistor array substrate in a second embodiment of the present invention.

FIG. 4 shows a top view of a thin-film transistor array substrate 300 of a transreflective liquid crystal display in a second embodiment of the present invention. The thin-film transistor array substrate 300 comprises a substrate (not shown), a plurality of pixels 304, a plurality of scan lines 310 and a plurality of data lines 320. The pixels 304 are located on the substrate between two neighboring data lines 320. Each of the pixels 304 has a transparent sub-pixel 304' and a reflective sub-pixel 304". The transparent sub-pixel 304' defines a transparent region T, while the reflective sub-pixel 304" defines a reflective region R. The transparent sub-pixel 304' comprises a transparent pixel electrode 308 and a first thin-film transistor 302a, and the reflective sub-pixel 304" comprises a reflective pixel electrode 306 and a second thin-film transistor 302b.

In this embodiment, the first thin-film transistors 302a and the second thin-film transistors 302b are disposed at opposing sides of the transparent sub-pixel 304' and the reflective sub-pixel 304", respectively. That is, the first thin-film transistor 302a of the transparent sub-pixel 304' and the second thin-film transistor 302b of the reflective sub-pixel 304" of the same pixel 304 are disposed at two sides of the scan line 310 and are electrically connected thereto. Therefore, the same scan line 310 drives the first and second thin-film transistors 302a and 302b simultaneously.

Figure 5:
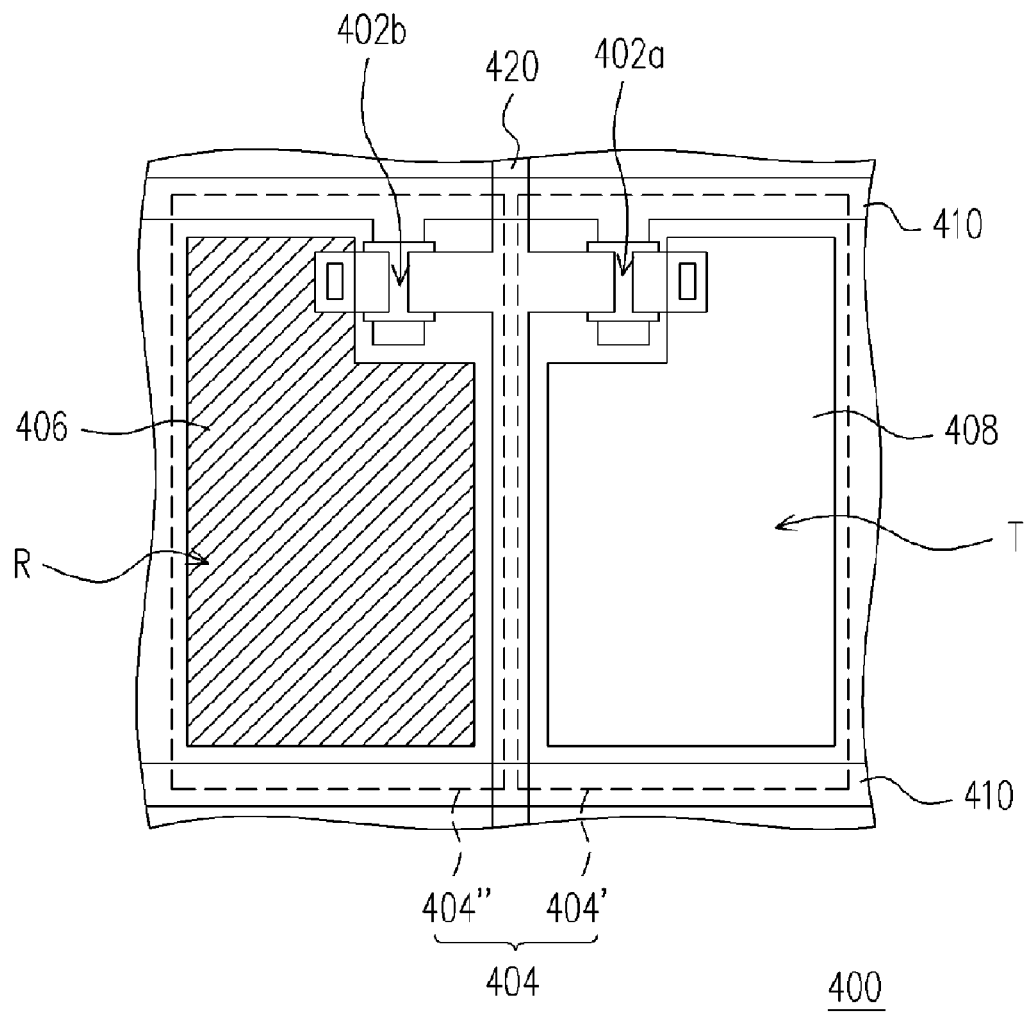
FIG. 5 shows the top view of a thin-film transistor array substrate in a third embodiment of the present invention.

FIG. 5 shows a top view of a thin-film transistor array substrate 400 of a transreflective liquid crystal display in a third embodiment of the present invention. The thin-film transistor array substrate 400 comprises a substrate (not shown), a plurality of pixels 404, a plurality of scan lines 410 and a plurality of data lines 420. The pixels 404 are located on the substrate between two neighboring data lines 420. Each of the pixels 404 has a transparent sub-pixel 404' and a reflective sub-pixel 404". The transparent sub-pixels 404' define a transparent region T, while the reflective sub-pixels 404" define a reflective region R. Each transparent sub-pixel 404' comprises a transparent pixel electrode 408 and a first thin-film transistor 402a, and each reflective sub-pixel 404" comprises a reflective pixel electrode 406 and a second thin-film transistor 402b.

In this embodiment, the first thin-film transistors 402a and the second thin-film transistors 402b are disposed at different sides of the transparent sub-pixel 404' and the reflective sub-pixel 404", respectively, but are electrically connected to the same data line 420. That is, the first thin-film transistor 402a of the transparent sub-pixel 404' and the second thin-film transistor 402b of the reflective sub-pixel 404" of the same pixel 404 are disposed at two sides of the data line 420 and are electrically connected thereto.

Referring to FIGS. 3 and 5, it is appreciated by people of ordinary skill in the art that when the pixels are disposed on the substrate at two neighboring scan lines and the first and second thin-film transistors of the transparent and reflective sub-pixels of the pixel are located at the same side, the data line may include a first data line and a second data line parallel to each other to extend to and being electrically connected at the edge of the substrate. The first thin-film transistor is electrically connected to and driven by the first data line. The second thin-film transistor is electrically connected to and driven by the second data line. FIG. 3 shows the first scan line 210' and the second scan line 210" formed by similar design.

In the present invention, the transparent region T and the reflective region R of the transreflective pixel have various kinds of allocations with various driving mechanisms. The ratio of the transparent region T to the reflective region R is about 1:1, for example. It is appreciated that the display area of the transparent region T and the reflective region R can be adjusted other than 1:1 according to specific display requirement without exceeding the scope of the present invention. In addition, the allocation of the above transparent region T and the reflective region R can be used in the same array substrate to optimize the display quality.

According to the above, the present invention has at least the following advantages.

1. The reflective and transparent sub-pixels of the thin-film transistor array substrate of the transreflective liquid crystal display are electrically connected to different thin-film transistors, such that the molybdenum layer formed between the transparent and reflective sub-pixels is not required. The process for forming the transreflective liquid crystal display is thus simplified.

2. The location of the thin-film transistor for each sub-pixel of the thin-film transistor array substrate of the transreflective liquid crystal can be adjusted according to the process or product requirement.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A thin-film transistor array substrate, applied to a transflective liquid crystal display, comprising:
   a substrate;
   a plurality of scan lines on the substrate;
   a plurality of data lines on the substrate; and
   a plurality of pixels on the substrate, each of the pixels comprising a transparent sub-pixel and a reflective sub-pixel, wherein each transparent sub-pixel has a transparent pixel electrode and a first thin-film transistor, each reflective sub-pixel has a reflective pixel electrode and a second thin-film transistor, the first and second thin-film transistors of each of the pixels are located at two sides of one data line and electrically connected thereto, and the transparent pixel electrode is electrically insulated from the reflective pixel electrode.

2. The thin-film transistor array substrate according to claim 1, wherein the first and second thin-film transistors of each of the pixels are located at one side of one of the scan lines and electrically connected thereto.

3. The thin-film transistor array substrate according to claim 1, wherein the first and second thin-film transistors of each of the pixels comprises bottom gate thin-film transistors.

4. A thin-film transistor array substrate, applied to a transflective liquid crystal display, comprising:
   a substrate;
   a plurality of scan lines on the substrate;
   a plurality of data lines on the substrate; and
   a plurality of pixels on the substrate, each of the pixels comprising a transparent sub-pixel and a reflective sub-pixel, wherein each transparent sub-pixel has a transparent pixel electrode and a first thin-film transistor, each reflective sub-pixel has a reflective pixel electrode and a second thin-film transistor, the first and second thin-film transistors of each of the pixels are located at one side of one of the scan lines and electrically connected thereto, and the transparent pixel electrode is electrically insulated from the reflective pixel electrode.

5. The thin-film transistor array substrate according to claim 4, wherein the first and second thin-film transistors of each of the pixels comprises bottom gate thin-film transistors.

* * * * *